US011182672B1

(12) United States Patent
Schmidt et al.

(10) Patent No.: US 11,182,672 B1
(45) Date of Patent: Nov. 23, 2021

(54) OPTIMIZED FOCAL-PLANE ELECTRONICS USING VECTOR-ENHANCED DEEP LEARNING

(71) Applicant: Ball Aerospace & Technologies Corp., Boulder, CO (US)

(72) Inventors: Zachary Schmidt, Boulder, CO (US); Bevan D. Staple, Longmont, CO (US); Cynthia Wallace, Louisville, CO (US); Jennifer H. Lee, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 125 days.

(21) Appl. No.: 16/597,411

(22) Filed: Oct. 9, 2019

Related U.S. Application Data

(60) Provisional application No. 62/743,429, filed on Oct. 9, 2018.

(51) Int. Cl.
| | |
|---|---|
| *G06N 3/08* | (2006.01) |
| *G06K 9/32* | (2006.01) |
| *G06K 9/62* | (2006.01) |
| *G06F 9/30* | (2018.01) |
| *G06F 9/38* | (2018.01) |
| *B64C 39/02* | (2006.01) |

(52) U.S. Cl.
CPC ............ *G06N 3/08* (2013.01); *B64C 39/024* (2013.01); *G06F 9/30036* (2013.01); *G06F 9/3877* (2013.01); *G06K 9/3241* (2013.01); *G06K 9/6256* (2013.01); *B64C 2201/123* (2013.01)

(58) Field of Classification Search
CPC ..... G06N 3/08; G06F 9/30036; G06F 9/3877; B64C 39/024; B64C 2201/123; G06K 9/3241; G06K 9/6256
USPC ........................................................ 382/103
See application file for complete search history.

(56) References Cited

U.S. PATENT DOCUMENTS

| | | | |
|---|---|---|---|
| 5,588,073 | A | 12/1996 | Lee et al. |
| 5,719,794 | A | 2/1998 | Altshuler et al. |
| 5,960,391 | A | 9/1999 | Tateishi et al. |
| 6,075,991 | A | 6/2000 | Raleigh et al. |
| 6,252,627 | B1 | 6/2001 | Frame et al. |
| 6,437,692 | B1 | 8/2002 | Petite et al. |
| 6,597,394 | B1 | 7/2003 | Duncan et al. |

(Continued)

FOREIGN PATENT DOCUMENTS

CN 108875595 * 5/2018 ............... G06K 9/00

OTHER PUBLICATIONS

U.S. Appl. No. 16/668,826, filed Oct. 30, 2019, Shima.

(Continued)

*Primary Examiner* — Jerome Grant, II
(74) *Attorney, Agent, or Firm* — Sheridan Ross P.C.

(57) ABSTRACT

Imaging systems and methods that implement a deep learning network are disclosed. The deep learning network utilizes pose information associated with at least some identified objects. The network is pruned, to reduce the amount of information processed and to optimize runtime processing when the network is deployed. In operation, the network identifies objects, and propagates pose information for at least some of the objects or components of identified objects. The network can be deployed as part of a processing system of an imaging system included as part of a remote platform.

20 Claims, 10 Drawing Sheets

(56) References Cited

U.S. PATENT DOCUMENTS

| | | | |
|---|---|---|---|
| 6,820,053 B1 | 11/2004 | Ruwisch | |
| 7,020,501 B1 | 3/2006 | Elliott et al. | |
| 7,590,098 B2 | 9/2009 | Ganesh | |
| 8,019,544 B2 | 9/2011 | Needelman et al. | |
| 8,583,371 B1 | 11/2013 | Goodzeit et al. | |
| 8,929,936 B2 | 1/2015 | Mody et al. | |
| 9,073,648 B2 | 7/2015 | Tsao et al. | |
| 9,191,587 B2 | 11/2015 | Wright et al. | |
| 9,294,365 B2 | 3/2016 | Misra et al. | |
| 9,449,374 B2 | 9/2016 | Nash et al. | |
| 9,702,702 B1 | 7/2017 | Lane et al. | |
| 9,924,522 B2 | 3/2018 | Gulati et al. | |
| 9,927,510 B2 | 3/2018 | Waldron et al. | |
| 10,021,313 B1 | 7/2018 | Chen et al. | |
| 10,048,084 B2 | 8/2018 | Laine et al. | |
| 10,271,179 B1 | 4/2019 | Shima | |
| 2005/0049876 A1 | 3/2005 | Agranat | |
| 2005/0228660 A1 | 10/2005 | Schweng | |
| 2006/0030332 A1 | 2/2006 | Carrott et al. | |
| 2007/0010956 A1 | 1/2007 | Nerguizian et al. | |
| 2008/0020354 A1* | 1/2008 | Goree | F41A 17/06 434/11 |
| 2008/0045235 A1 | 2/2008 | Kennedy et al. | |
| 2008/0293353 A1 | 11/2008 | Mody et al. | |
| 2009/0179142 A1* | 7/2009 | Duparre | H01L 27/14627 250/208.1 |
| 2009/0197550 A1 | 8/2009 | Huttunen et al. | |
| 2009/0268619 A1 | 10/2009 | Dain et al. | |
| 2010/0091017 A1* | 4/2010 | Kmiecik | G06T 3/4038 345/420 |
| 2012/0071105 A1 | 3/2012 | Walker et al. | |
| 2012/0072986 A1 | 3/2012 | Livsics et al. | |
| 2012/0163355 A1 | 6/2012 | Heo et al. | |
| 2012/0167144 A1* | 6/2012 | Avison-Fell | H04N 1/00331 725/51 |
| 2012/0202510 A1 | 8/2012 | Singh | |
| 2012/0238201 A1 | 9/2012 | Du et al. | |
| 2012/0238220 A1 | 9/2012 | Du et al. | |
| 2014/0218520 A1* | 8/2014 | Teich | H04N 5/2354 348/143 |
| 2014/0232871 A1* | 8/2014 | Kriel | H04N 5/2259 348/148 |
| 2014/0282783 A1 | 9/2014 | Totten et al. | |
| 2014/0329540 A1 | 11/2014 | Duggan et al. | |
| 2015/0009072 A1 | 1/2015 | Nijsure | |
| 2016/0101779 A1* | 4/2016 | Katoh | G06K 9/00791 340/435 |
| 2016/0173241 A1 | 6/2016 | Goodson et al. | |
| 2016/0187477 A1* | 6/2016 | Wang | G01S 7/03 342/52 |
| 2017/0120906 A1 | 5/2017 | Penilla et al. | |
| 2017/0123429 A1* | 5/2017 | Levinson | G01C 21/34 |
| 2017/0366264 A1 | 12/2017 | Riesing et al. | |
| 2018/0019910 A1 | 1/2018 | Tsagkaris et al. | |
| 2018/0025641 A1 | 1/2018 | LaVelle et al. | |
| 2018/0033449 A1 | 2/2018 | Theverapperuma et al. | |
| 2018/0053108 A1* | 2/2018 | Olabiyi | B60W 50/0097 |
| 2018/0082438 A1 | 3/2018 | Simon et al. | |
| 2018/0107215 A1 | 4/2018 | Djuric et al. | |
| 2018/0149730 A1 | 5/2018 | Li et al. | |
| 2018/0268571 A1* | 9/2018 | Park | G06N 3/0454 |
| 2018/0293893 A1* | 10/2018 | Yang | B60W 30/0956 |
| 2018/0324595 A1 | 11/2018 | Shima | |
| 2019/0049955 A1* | 2/2019 | Yabuuchi | B60W 60/0053 |
| 2019/0066713 A1 | 2/2019 | Mesgarani et al. | |
| 2019/0122689 A1 | 4/2019 | Jain et al. | |
| 2019/0164430 A1* | 5/2019 | Nix | G08G 1/163 |
| 2019/0213887 A1* | 7/2019 | Kitayama | G08G 1/005 |
| 2019/0294108 A1 | 9/2019 | Ozcan et al. | |
| 2019/0318725 A1 | 10/2019 | Le Roux et al. | |
| 2019/0322282 A1* | 10/2019 | Theodosis | G06K 9/00791 |
| 2019/0353741 A1 | 11/2019 | Bolster, Jr. et al. | |
| 2019/0363430 A1 | 11/2019 | Wang et al. | |

OTHER PUBLICATIONS

U.S. Appl. No. 16/693,992, filed Nov. 25, 2019, Tchilian.
U.S. Appl. No. 16/745,725, filed Jan. 17, 2020, Tchilian et al.
U.S. Appl. No. 16/806,367, filed Mar. 2, 2020, Frye et al.
U.S. Appl. No. 16/886,983, filed May 29, 2020, Regan.
"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].
Buchheim "Astronomical Discoveries You Can Make, Too!" Springer, 2015, pp. 442-443.
Ma et al. "Attitude-correlated frames approach for a star sensor to improve attitude accuracy under highly dynamic conditions," Applied Optics, Sep. 2015, vol. 54, No. 25, pp. 7559-7566.
Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.
Nair et al. "Accelerating Capsule Networks with Tensor Comprehensions," Princeton, May 2018, 8 pages.
Ni et al. "Attitude-correlated frames adding approach to improve signal-to-noise ratio of star image for star tracker," Optics Express, May 2019, vol. 27, No. 11, pp. 15548-15564.
Wang "Research on Pruning Convolutional Neural Network, Autoencoder and Capsule Network," before Oct. 9, 2018, 11 pages.
Wang et al. "An Optimization View on Dynamic Routing Between Capsules," ICLR 2018 Workshop, Feb. 2018, 4 pages.
Gu et al. "Continuous Deep Q-Learning with Model-based Acceleration," Proceedings of Machine Learning Research, vol. 48, 2016, pp. 2829-2838.
Happel et al. "The Design and Evolution of Modular Neural Network Architectures," Neural Networks, 1994, vol. 7, pp. 985-1004.
Johnson "Orbital Debris: The Growing Threat to Space Operations," 33rd Annual Guidance and Control Conference, Feb. 6, 2010, Breckenridge, CO, United States.
Peng et al. "Improving Orbit Prediction Accuracy through Supervised Machine Learning,".
Taylor "Transfer Learning for Reinforcement Learning Domains: A Survey," Journal of Machine Learning Research, 2009, vol. 10, pp. 1633-1685.
Watkins "Learning from Delayed Rewards," King's College, May 1989, Thesis for Ph.D., 241 pages.
Goodfellow et al. "Deep Learning," MIT Press, 2016, 796 pages [retrieved online from: www.deeplearningbook.org].

* cited by examiner

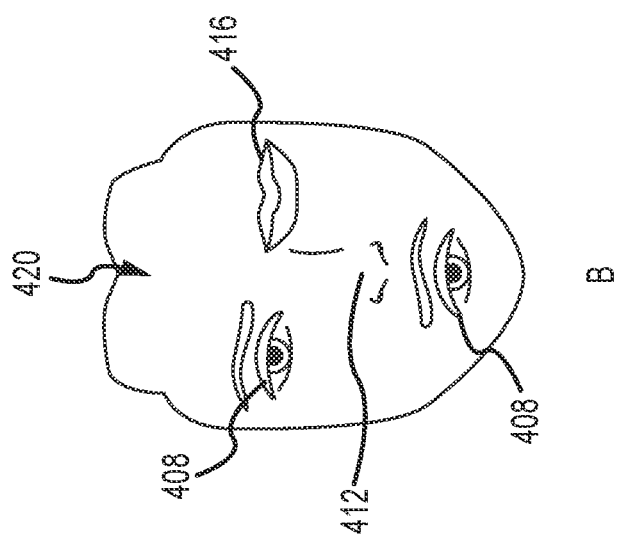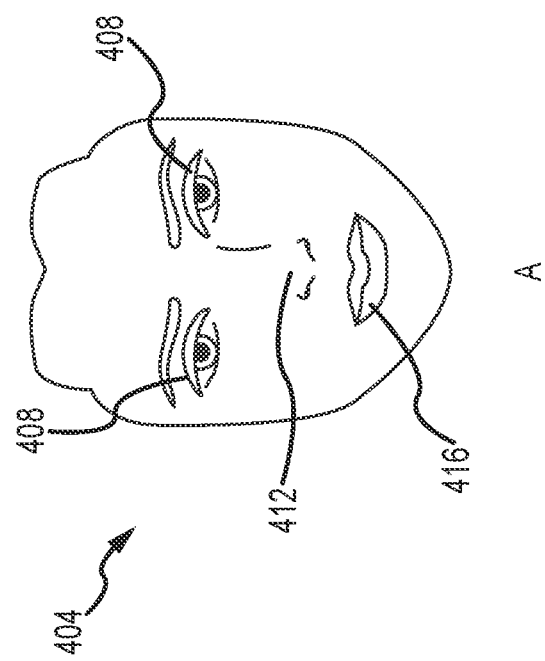
FIG. 4

OPTIMIZED FOCAL-PLANE ELECTRONICS USING VECTOR-ENHANCED DEEP LEARNING

CROSS-REFERENCE TO RELATED APPLICATIONS

This application claims the benefit of U.S. Provisional Patent Application Ser. No. 62/743,429, filed Oct. 9, 2018, the entire disclosure of which is hereby incorporated herein by reference.

FIELD

This disclosure is directed towards systems and methods for optimized runtime object identification and classification.

BACKGROUND

Systems that provide optical data, including digital imaging systems, are increasingly common. The analysis of image data often includes localizing objects of information within image frames, and identifying those objects. As a result of the vast amount of information such systems are capable of generating, there is increasing interest in automating the process of analyzing image data. Useful end products of automatic data analysis could include providing relevant data gleaned from images to human decision-makers. In addition, it would be desirable to provide an actionable analysis in real time or near real-time, to enable appropriate action to be taken autonomously. However, the speed and accuracy required in order to provide meaningful automated analysis have been difficult to achieve.

In addition to localizing and identifying objects within image data, it is often desirable to make inferences from that data. In particular, there is a growing need for optimized runtime (e.g., real-time in seconds or near real time in minutes or longer) object classification and identification to help infer actionable intelligence for a broad set of customers in the defense, civil, and commercial markets. For example, in the military there is a need for satellite and UAV imaging sensors to provide real-time actionable intelligence to commanders so that they can respond to threats. As another example, where a localized and identified object is a vehicle, it would be desirable to determine the speed of the vehicle and the direction in which it is traveling. However, making such inferences only increases the demand on automated object recognition or detection systems. In addition, as the number of images collected scale, methods to help automate the inference process must scale as well, to sift through the vast amount of information. Accordingly, systems capable of making such determinations autonomously and/or in real time or near real time have not been practical.

SUMMARY

In accordance with embodiments of the present disclosure, an imaging system is provided that is capable of analyzing image information to identify objects within a scene encompassed by an image. The accuracy of the system is enhanced by tracking not only the positions of objects within an imaged scene, but also other vector-based information about the objects. For instance, the pose (i.e. the combination of position and orientation) of individual objects or the relative pose between objects can be propagated through a deep learning network that has been trained to identify objects and to infer information about such objects.

The performance of the deep learning network is enhanced by removing unnecessary network branches. More particularly, parts of the trained model that are not activated after training, and parts of the trained model that are not contributors to the specific vector outputs of interest selected by a user for a particular application or pruned by setting their known weights to zero. This simplifies the deep learning network by reducing the number of operations performed during runtime. As the result is a deep learning network with optimized vector concatenation (OSVC).

In accordance with the least some embodiments of the present disclosure, the deep learning network is implemented as part of an imaging system. More particularly, the deep learning network can be implemented by application programming executed on reconfigurable focal plane electronics (RFPE) provided as part of the imaging system. The RFPE can include memory and one or more processors, including graphics processing units (GPUs). In accordance with further embodiments of the present disclosure, the RFPE implementing the deep learning network may be carried by a platform that also carries a focal plane array that obtains images that are preprocessed, processed, and used to generate output that includes the pose of objects identified from within an image collected by the focal plane array of the imaging system.

Methods in accordance with embodiments of the present disclosure include propagating pose information for objects of interest through a deep learning network. The pose information can include information regarding the position and orientation of the individual objects, the position and orientation of objects relative to one another, and the position and orientation of elements that are part of objects of interest. The deep learning network can be executed to provide information, including information identifying individual objects and information inferred from or related to the pose of such objects to an end-user for further analysis, or to further application programming that can act with respect to an identified object within a scene.

Additional features and advantages of embodiments of the disclosed systems and methods will become more readily apparent from the following description, particularly when taken together with the accompanying drawings.

BRIEF DESCRIPTION OF THE DRAWINGS

FIG. 4 contains comparative images with correct and incorrect spatial relationships between included objects respectively;

DETAILED DESCRIPTION

Figure 1:
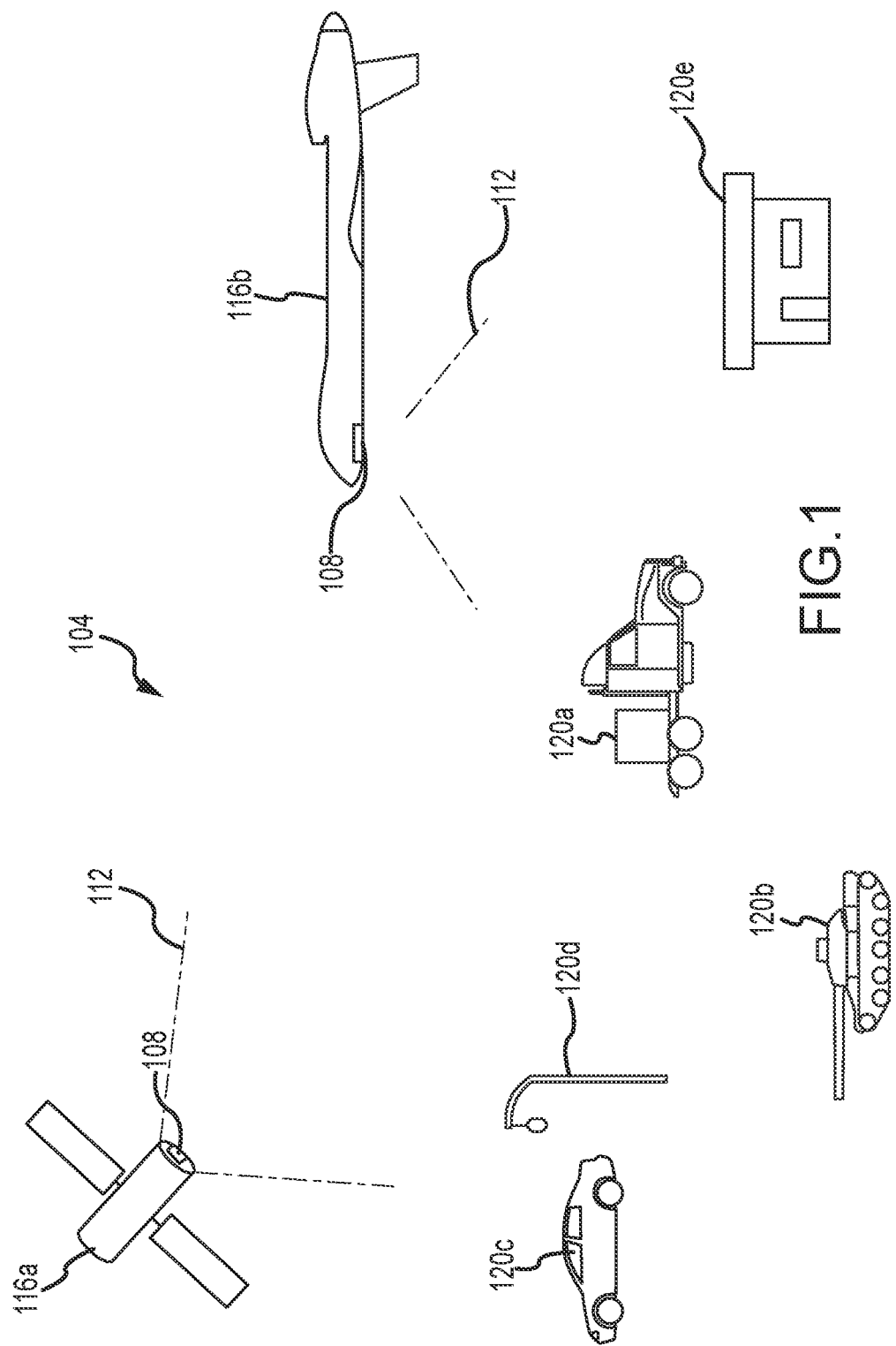
FIG. 1 depicts scenarios in which real-time target identification and classification in accordance with embodiments of the present disclosure can be applied.

In various scenarios, it can be desirable to classify objects within an image and to infer information about the objects from the image. For example, as depicted in FIG. 1, an image of a scene 104 can be obtained by an imaging system 108 having a field of view 112 that encompasses all or portions of the scene 104. As shown in the illustrated example, the imaging system 108 can be carried by a platform 116, such as a satellite 116a, or an unmanned aerial vehicle (UAV) 108b. However, other platforms 116 can be associated with an imaging system 108. Examples of other platforms 116 include, but are not limited to, a manned spacecraft, an interplanetary spacecraft, an interstellar spacecraft, an orbiter, a lander, a missile, an aircraft, a balloon, a stratospheric balloon, a terrestrial vehicle, a ship or any other platform or device to which an imaging system 108 can be mounted or associated.

The image of a scene 104 obtained by an imaging system 108 may contain various objects 120. Moreover, depending on the context in which the image information is obtained or is intended to be applied, some or all of the objects 120 can be important to identify or classify. For instance, the example scene 104 in FIG. 1 contains a number of objects 120 in the form of vehicles, such as a truck 120a, a tank 120b, and a car 120c. Other example objects 120 within the scene include a lamppost 120d and a building 120e. As can be appreciated by one of skill in the art, it can be important to identify one or both of the truck 120a and the tank 120b from other objects within an image of a scene 104. In addition, and as described herein, embodiments of the present disclosure provide systems and methods to identify objects 120 within an image 108 autonomously. In accordance with further embodiments of the present disclosure, systems and methods are provided that can determine characteristics of objects 120 and relationships between objects 120 within an image. Moreover, embodiments of the present disclosure are capable of inferring information from the classified and identified objects 120 within an image that includes some or all of relationships between the objects 120, characteristics of the objects 120, and relationships between elements of the objects 120. In accordance with still further embodiments of the present disclosure, systems and methods as disclosed herein can perform some or all of the identification, classification, and inferential functions in real-time or near real time. Moreover, such functions can be performed by embodiments of the present disclosure using electronics deployed as part of a platform 108, including but not limited to a remote platform 116, such as a satellite 116a, a UAV 116b, or other platform acting entirely or partially autonomously.

Figure 2:
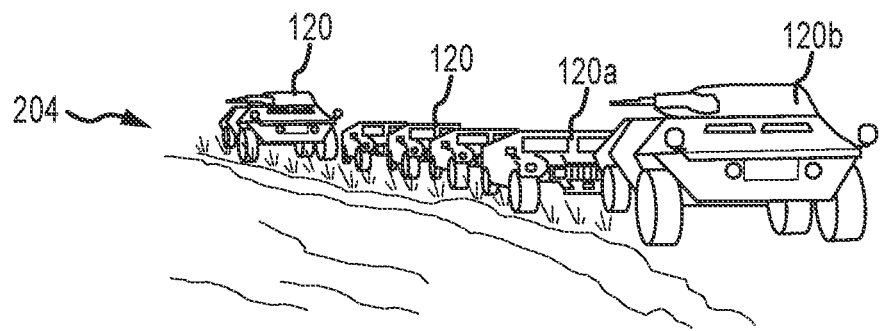
FIG. 2 is a depiction of a scenario in which the relationship between imaged objects is significant to extracting information from the imaged scene.

FIG. 2 is a depiction of an image 204 of a scene 104 in which the relationship between imaged objects 120 is significant to extracting information from the imaged scene 104. More particularly, the example image 204 includes a number of objects 120 in the form of vehicles travelling in the same direction. This can be expressed as the pose and orientation of the objects 120, with the position of the vehicles being relatively close to one another, and with the orientation of the vehicles being the same, forming a line. From this information, it can be inferred that the objects 120 within this scene 104 form a convoy. Moreover, it can be inferred that the objects 112 within this scene are travelling in a particular direction. In addition, the objects 120 in the image can be specifically identified as trucks 120a and tanks 120b, or even specific models of trucks 120a and tanks 120b. Each level of specificity with which the objects 120 are identified allows for additional information to be in inferred. Embodiments of the present disclosure can make such determinations autonomously and in real-time or near real-time.

Figure 3:
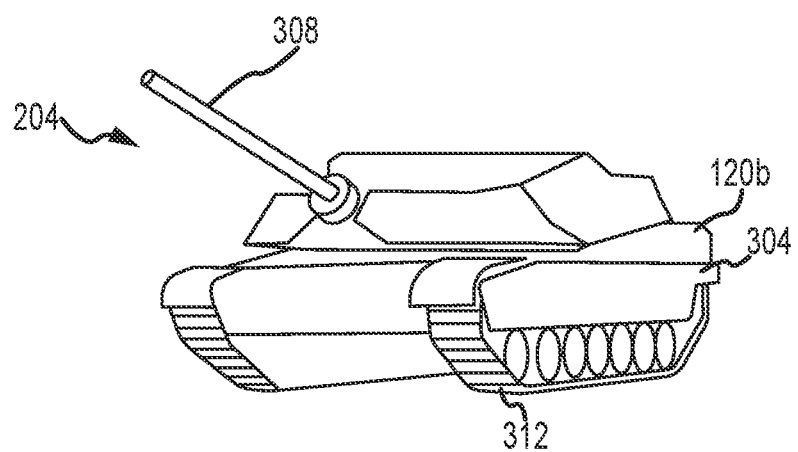
FIG. 3 is a depiction of a scenario in which the pose of components of a singular object is significant to extracting information from the imaged scene.

FIG. 3 depicts an image 204 of a scenario in which the relative pose of components of a singular object 120 is significant to extracting information from the imaged scene 104. In this image 204, the object 120 is a tank 120b. The tank 120b is composed of sub-objects or characteristic features in the form of a body or hull 304, a turret mounted gun 308, and a pair of tracks 312. The pose information in this example can include the direction of travel of the tank 120b, as indicated by the orientation of the body 304 and/or the tracks 312, and the direction in which the gun 308 is pointed. Embodiments of the present disclosure can make such determinations autonomously and in real-time or near real-time.

To aid the process of high-confidence inference about objects 120 of interest in an image 204 of a scene 104, including but not limited to scenes 204 as in the examples of FIGS. 2 and 3, a system must be able to track and provide not simply the locations of objects 120 within the respective scene 104 relative to other objects 120 and/or within a coordinate system, but also other vector-based information about the objects 120. A particularly useful vector attribute of an object 120 is the pose (i.e., the combination of position and orientation), either of individual objects 120 or relative pose between objects 120, such as the spatial relationships between the objects 120. For example, as shown in FIG. 2, we can observe the relative orientation between the objects (in this example, vehicles) and infer that there is a military convoy. Additionally, as shown in FIG. 3, we observe the pose and relative pose of objects 120 (tank gun 308 and tank body 304) and infer the direction of travel and aim. In accordance with embodiments of the present disclosure, vector information regarding the pose of objects is propagated through a deep learning network and can be used in real-time or near real-time to make inferences about objects 120 or groups of objects 120.

The processing and use of pose information is natural to the human mind. In recent years, Deep Learning (DL) networks and Graphical Processing Units (GPUs) have emerged as effective tools for enhancing the accuracy and speed of object classification and identification in imagery by automated systems. However, conventional DL networks are not designed to keep track of vector-based relationships, such as the spatial relationships between objects. For example, FIG. 4 contains comparative images with correct and incorrect spatial relationships between included objects respectively. In particular, the image of a face 404 in A of FIG. 4 includes two eyes 408, a nose 412, and a mouth 416, all in their proper relative locations. The composite image 420 in B of FIG. 4 includes the same two eyes 408, nose 412, and mouth 416 as in A, except that the location of one of the eyes and the mouth have been exchanged with one another. Since conventional DL networks do not capture vector-based information such as spatial relationships, a conventional DL network would classify both the image of a face 404 on the left (in A of FIG. 4) and the composite image 420 on the right (in B of FIG. 4) as a face, even though the picture on the right has incorrect spatial relationships between the eyes 408 and the mouth 416. Moreover, where the individual elements 408, 412, and 416 are identified as being the same, a conventional DL network would identify the face 404 and the composite image 420 as the face of the same individual. This is because conventional DL networks can be trained to recognize face features, but do not propagate or consider vector information, such as the position and orientation of recognized features.

Figure 5:
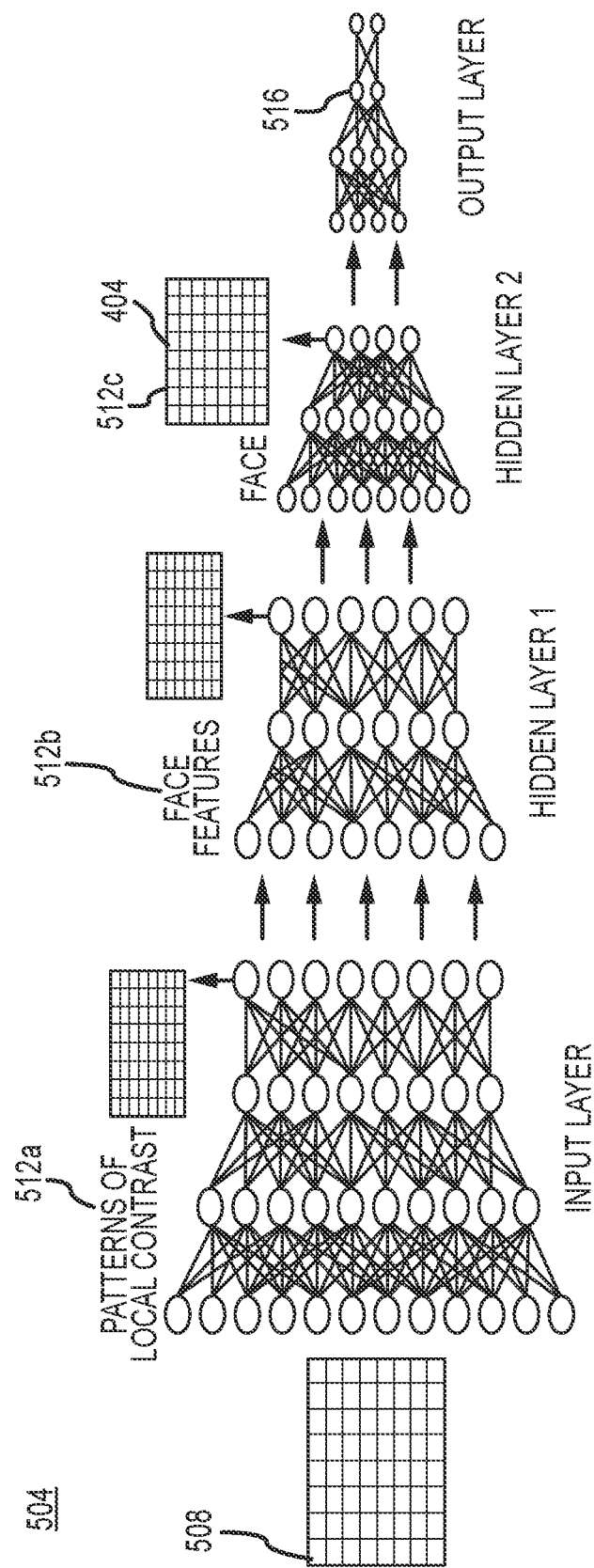
FIG. 5 depicts a conventional deep learning network.

FIG. 5 depicts a conventional deep learning network 504. As shown, this network 504 can be trained using input in the form of a large number of images 508 to identify patterns of local contrast in a first layer 512a, to recognize face features (e.g. eyes 408, noses 412, and mouths 416) in a second layer 512b, and to recognize a face 404 in a third layer 512c. However, there is no provision for inputting or propagating vector information. Accordingly, the system may provide an output 516 that classifies and identifies the example images 404 and 420 of FIG. 4 equivalently. More particularly, conventional DL networks utilize broad, scalar information early in the deep network to classify things like edges and gradients, building up to higher level features, and then make generic representations about an image. As such, conventional deep learning networks 504 require vast amounts of imagery for training, and risk over-fitting, in an attempt to capture the more advanced features. These same features could alternatively be identified by vector-based information (orientation, spatial relationships) that a human would use to infer actionable intelligence from the image.

Figure 6:
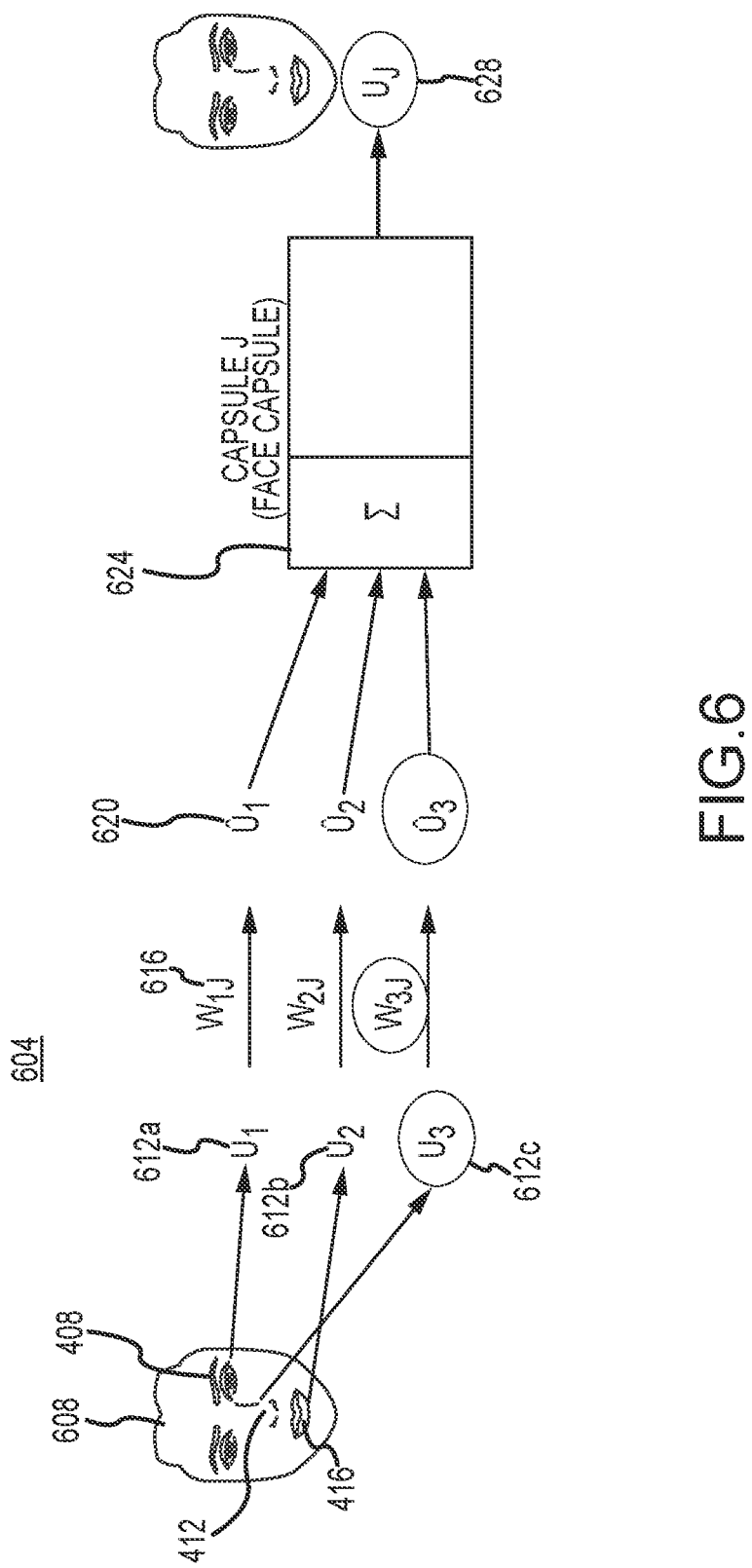
FIG. 6 depicts a Hinton's capsule network.

FIG. 6 depicts an example of a vector based deep learning network 604, and more particularly of an implementation of Hinton's capsule network, in which vector information is provided as an input and is propagated through the network 604. The vector or pose information can include the position (x, y, z) and orientation of objects within an image. Accordingly, the input 608 to the network 604 includes not only the features of a face, but also pose information for those features. A capsule 612 for each feature is created. For example, a capsule 612a for the left eye 408, a capsule 612b for the mouth 416, and a capsule 612c for the nose 412 are created that each includes pose information for the respective features. A weight matrix 616 is then applied that encodes the spatial relationship between the features, resulting in the creation of matrix multiplied capsules 620. The matrix multiplied capsules 620 of the features are then routed to a face capsule 624. A vector output 628 of the face capsule with the pose of the face encoded is then produced. Because the network 604 considers vector information, it would not only correctly recognize the first image 404 of FIG. 4 as the face of a person, but it also would recognize that the second image 420 of that figure does not show a person's face. However, a network 604 that considers vector information for all recognized objects or features within an image is impractical, particularly for deployment on remote platforms, because it is generally slower than a conventional network 504. Accordingly, given the significantly larger amount of information that must be propagated as part of a Hinton's capsule network, HCN optimization is beneficial to enhance runtime performance.

Figure 7:
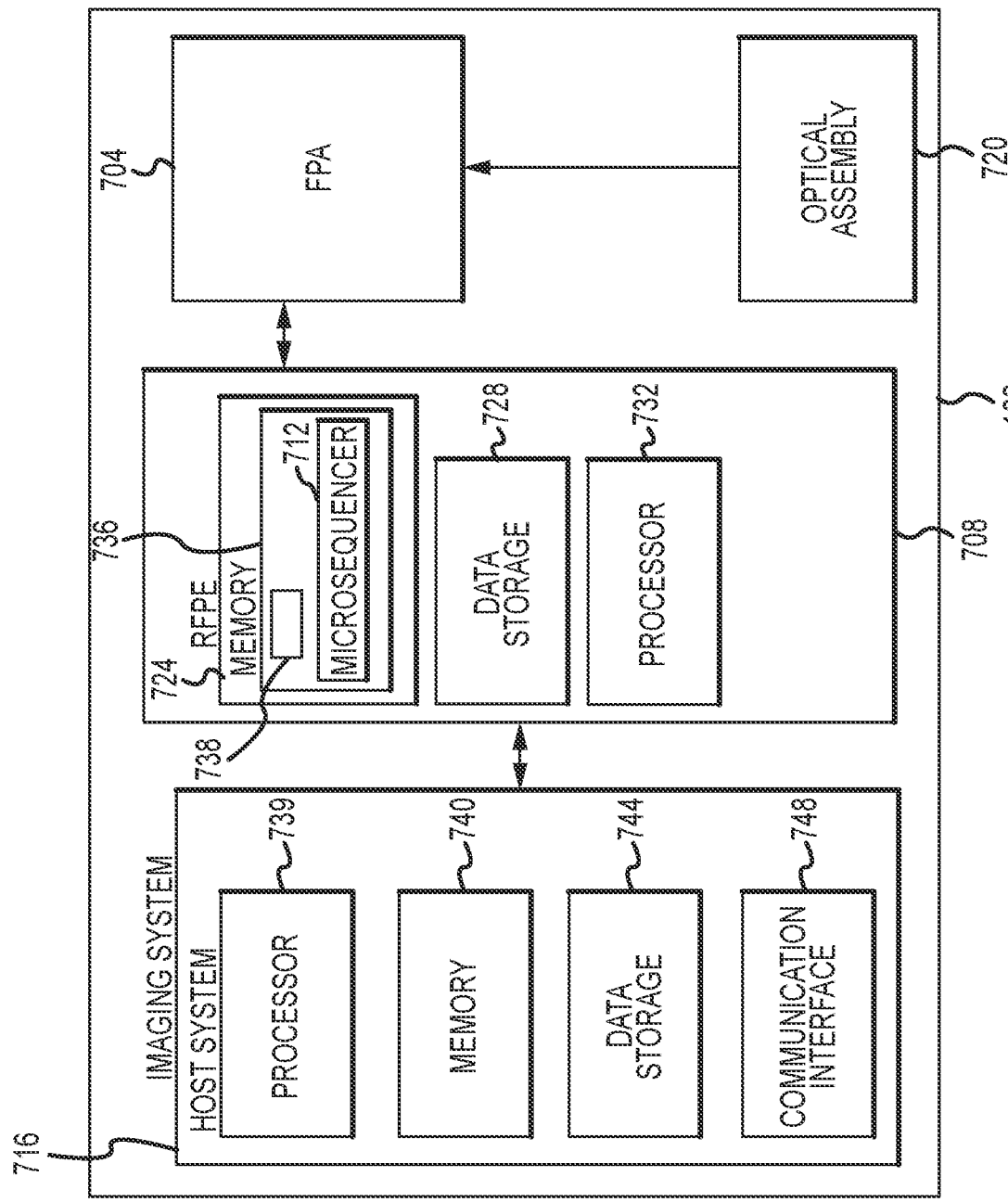
FIG. 7 is a block diagram of an imaging system in accordance with embodiments of the present disclosure.

FIG. 7 is a block diagram of an imaging system 108 in accordance with embodiments of the present disclosure. The imaging system 108 generally includes a digital focal plane array 704. The imaging system 108 also includes reconfigurable focal plane electronics (RFPE) 708.

In accordance with at least some embodiments of the present disclosure, the RFPE 708 implements a microsequencer 712. The imaging system 708 can also include or can be connected to a host system 716. In addition, the imaging system can include a lens or optical assembly 720 for focusing collected light onto the focal plane array 704.

As an example, but without limitation, the focal plane array 704 can include a backside illuminated CMOS image sensor having a 1024×1024 two-dimensional array of pixels. As can be appreciated by one of skill in the art after consideration of the present disclosure, in addition to a focal plane array formed from a plurality of photosensitive sites or pixels, the focal plane array 708 can incorporate or be associated with driver and analog-to-digital conversion (ADC) circuitry, enabling the focal plane array 704 to provide a digital output representative of an amplitude or intensity of light detected at each pixel within the focal plane array 704.

The RFPE 708 can include memory 724, data storage 728, and a processor 732. The RFPE memory 724 can include volatile or non-volatile solid-state memory, such as DRAM, SDRAM, or the like. The RFPE memory 724 can provide short or long term storage for instructions 736 that are executed by the RFPE processor 732 to implement operations or functions of the RFPE 708 and the imaging system 108 generally, including the implementation of a deep learning network 738 as described herein. The RFPE memory 724 can also store configurable parameters, intermediate data products, output data, and the like. In accordance with further embodiments of the present disclosure, the application instructions 736 can include instructions that implement the microsequencer 712. The RFPE data storage 728 generally includes non-volatile data storage, such as flash memory, solid-state drives, hard disk drives, optical disk drives, erasable programmable ROM, and the like. The RFPE data storage 728 can provide short or long term storage for application instructions 736 that are executed by the RFPE processor 732, configurable parameters, intermediate data products, output data, and the like. The RFPE processor 732 can include one or more multi-threaded processors, graphics processing units (GPUs), general purpose processors, field-programmable gate arrays, or the like. For example, the RFPE processor can be formed from a multi-threaded processor in combination with multiple GPUs. In accordance with further embodiments of the present disclosure, the RFPE 708 can include a plurality of boards or cards, with each board including memory 724 and a GPU or other processor 732.

The host system 716 can include a processor 739, memory 740, data storage 744, and a communications interface 748. The processor 739 can include a general purpose programmable processor or the like. The memory 740 can include, for example, volatile or non-volatile memory, and can provide short or long-term storage for application programming or instructions, control parameters, intermediate data products, data, or the like. The data storage 744 generally includes non-volatile storage for application programming or instructions, control parameters, intermediate data products, data, or the like. In addition to supporting the passing of commands to and the receiving data from the RFPE 708, the communications interface 748 can support communications between the imaging system 108 and remote systems or communication nodes.

In operation, the host system 716 sends commands to the RFPE 708. The RFPE 708 itself, or through a microsequencer 712 function implemented by the RFPE, in turn provides instructions to the digital focal plane array 204 that configure the digital focal plane array 204 appropriately, and that operates the digital focal plane array 204 to obtain an image in accordance with the host system 716 instructions.

Moreover, the microsequencer 712 can control the digital focal plane array 204 to obtain a sequence of images in response to a command received from the host 716. The host system 716 can also perform functions related to operation of the platform 116 and/or the imaging system 108, including but not limited to: operations relating to the positioning of the platform 116; receiving and acting on instructions from a command center; transmitting images collected by the imaging system 108; transmitting the results of image analysis performed by the RFPE 708, as discussed in greater detail elsewhere herein; and performing actions, including but not limited to actions concerning the positioning of the platform 716, and actions taken by the platform 716 relative to objects 120 within a scene 104 identified through operation of the RFPE 708 and/or commands received from a remote authority.

Figure 8:
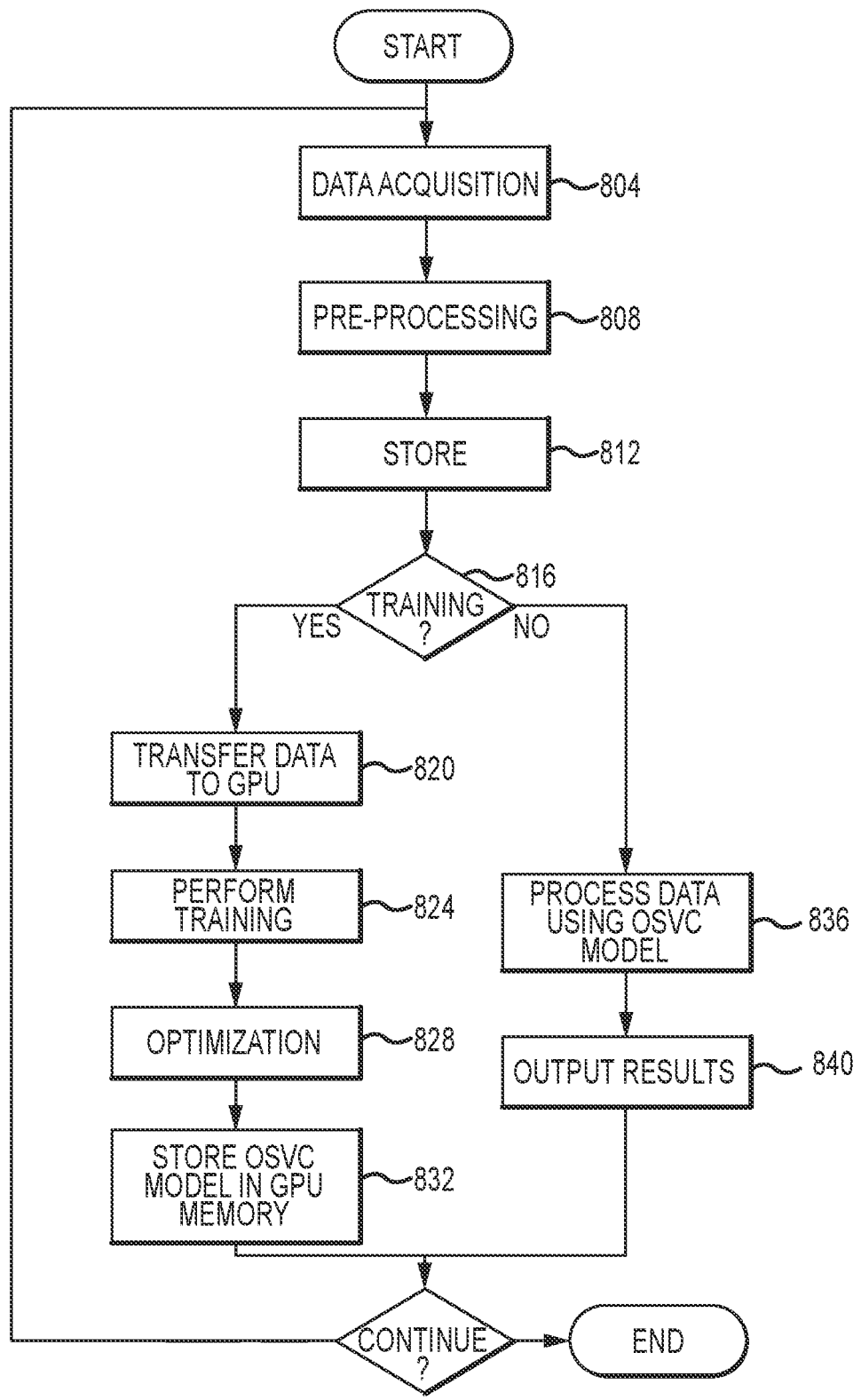
FIG. 8 is a flowchart depicting aspects of the operation of a deep learning network in accordance with embodiments the present disclosure.

FIG. 8 depicts aspects of a deep learning network 738 in accordance with embodiments the present disclosure. The deep learning network 738 can be implemented by the RFPE 708 through execution of application instructions 736 stored in the RFPE memory 724 and executed by the RFPE processor 732. Initially, at a data acquisition or input stage (step 804), an imaging system is operated to take multiple raw images of the same or different scenes 104. During a training phase, the images may contain objects 120 in the form of targets of interest for which automatic classification and identification by the deep learning network 738, after training, is desired. Moreover, during training, the images may be obtained by an imaging system that is separate from and/or different than the imaging system 108. In accordance with other embodiments of the present disclosure, the imaging system 108 or an instance of the imaging system 108 that will be operated in connection with a trained deep learning network 738 as described herein can be used to obtain some or all of the images used for training.

Preprocessing is then performed (step 808). In preprocessing, some or all of the multiple images obtained as part of the data acquisition step are preprocessed to remove noise and image defects. More particularly, preprocessing can include frame co-addition, nonuniformity correction (NUC), compression, and data formatting processes. During a training phase, preprocessing may be performed using processing components that are different than and/or or provided separately from the RFPE 708. A reconfigurable focal plane electronics (RFPE) digital module 708 provided as part of an imaging system 108 can also be used to preprocess the multiple raw images to remove the different noise and image defects. Moreover, in a deployed imaging system 108, the RFPE digital module 708 receives the multiple images obtained by the focal plane array 704 as part of the data acquisition step, and preprocesses those images to remove noise and image defects. In accordance with embodiments of the present disclosure, the RFPE digital module 708 can comprise a plurality of processing boards, among which the image data is distributed. As an example, but without limitation, each processing board can receive an aggregate of image data at a rate of up to 50 Gbps. The extent of image processing conducted in the digital board can vary for each application. Additional or alternative preprocessing steps can also be taken. The processed image data is then stored in memory (e.g. memory 724) or data storage (e.g. data storage 728) for later deep learning with optimized selected vector concatenation (step 812).

At step 816, a determination is made as to whether the preprocessed images constitute training data or actual data. Where the images consist of training data, the preprocessed images are transferred from memory to the RFPE 708 for training of the deep learning network 738 (step 820). In accordance with the least some embodiments of the present disclosure, each cleaned up (i.e. preprocessed) image is transferred from memory to one or more graphical processing units (GPUs) included in the RFPE processor 732. As can be appreciated by one of skill in the art after consideration of the present disclosure, a GPU is a processor that is specially designed to rapidly perform image and graphics processing using a highly parallel structure to manipulate large blocks of data. The processing includes training the deep learning network 738 within the GPU (step 824). More specifically, the deep learning network 738 may implement a Hinton's capsule network, and the training can include providing images to the deep learning network 738 that includes pose information of objects 120 in each image. A particular example of the processing performed by the RFPE processor 732 is training a Hinton's capsule network model to learn to predict the classification and identification of targets of interest. During the training procedure, an HCN model is trained within the GPU using images containing different poses of targets of interest.

The trained HCN model is then optimized by pruning to form the OSVC model implemented by the deep learning network 738 (step 828). More particularly, pruning can be employed to simplify the HCN of the deep learning network 738 for optimized runtime performance. Pruning can include a plurality of individual or specific combined methods that: (a) use "weight similarity" to eliminate redundant neurons from the same network layer that have the same weights, (b) examine and eliminate the parts of the trained model that are not activated after it's trained, (c) examine and eliminate those parts that do not contribute to the specific vector outputs of interest selected by a user for a particular application, (d) optimizing the processing of the routing mechanisms between specific capsules in the HCN, (e) optimizing or reducing the number of the routings between specific capsules in the HCN, (f) use mechanisms such as a hybrid of a conventional DL and an HCN or an optimized HCN is which the conventional DL is used to quickly identify objects or object parts of interest in a larger scene or image using techniques such as localization (e.g., using bounding boxes or other methods) and passing only the bounded objects or object parts to the HCN or optimized HCN for processing, and/or (d) other methods. Specifically, in accordance with at least some embodiments of the present disclosure, two methods of pruning can be employed. Specifically, in this example, the parts of the trained model that are not activated after training can be identified, and those parts of the model that do not contribute to the specific vector outputs of interests selected by a user for a particular application can be identified. These network branches, which have been identified as unnecessary, can be "pruned" away by setting their known weights to zero. Pruning the network simplifies the number of operations required as compared to an unpruned network. The trained OSVC model implemented by the deep learning network 738 is then stored in the GPU memory 724 to later automatically classify and identify objects and their vector information in real image data (step 832).

More particularly, the pose of certain objects 120 within an image can be of little or no interest or importance. Accordingly, in a scene 104 containing one or more identified objects 120, the pose of an object 120 or a component of an object 120 can be of little value as an input to a network configured to perform a particular function or sent of functions. As an example, where an image contains multiple identified objects 120, at least a first one of the identified objects 120 is a tank, and at least a second one of the identified objects is a lamp post, the pose of the lamp post may be disregarded or pruned from the data considered by the network 738, while the pose of the tank 120 within the image can be maintained, to allow information (e.g. the identification of a convoy and the direction the convoy is travelling in) to be inferred from the image. As another example, an identified object 120 within an image in the form of a truck may have an identified component, such as a window, associated with a pose that is unimportant, while another identified object in the form of a tank 120 may have an identified component, such as a gun 308, for which the pose is significant and for which the pose information is maintained, for example to infer where the tank is aiming its gun 308 at another object 120 of interest. In general, vector information associated with pose information that is unimportant and therefore has been pruned is not propagated through the deep learning network 738, promoting the efficiency and speed of operation of the deep leaning network. Vector information that is significant is propagated through the deep learning network 738, promoting the ability of the deep learning network 738 to provide output in the form of or derived from such vector information. By propagating significant vector information, the accuracy of identification information, and the usefulness and accuracy of inferences drawn from and about objects within an image or series of images, can be maintained at levels high enough to enable meaningful action to be taken by the deep learning network 738, including identifying images and sub-images with objects 120 for further review by human analysts, or even autonomous action by the deep learning network 738 or an associated autonomous system. Moreover, such identifications and determinations can be made without requiring reference to a catalog. In addition, by only selectively propagating vector information, for instance by not propagating vector information for objects deemed insignificant, the speed of the deep learning network 738 can be increased or optimized. Accordingly, the size and power of the memory 724, processors 732, data storage 732, and or associated components used to implement the deep learning network 738 can be lower than would be required if a full HCN were implemented. Moreover, the deep learning network 738 can maintain the accuracy required to take action relative to objects.

The trained OSVC model of the deep learning network 738 is then ready for deployment. Once deployed, the OSVC model is placed in the field and used to identify areas of interest within a scene 104 captured by one or more images obtained by an imaging system 108 in accordance with embodiments of the present disclosure. In an exemplary deployment scenario, the imaging system 108 is carried by a platform 116. In accordance with the least some embodiments of the present disclosure, the platform 116 may operate autonomously, semi-autonomously, and/or remotely. In addition, in a deployed imaging system 108, the steps of data acquisition 804, preprocessing 808, and storage of the preprocessed image 812 can be performed in the same or similar way as such steps are performed in connection with the training the network 738. However, when deployed, the imaging system 108 is operated to obtain actual image data from a scene or scenes 104 of interest. Operation of the imaging system 108 can be performed autonomously, semi-autonomously, or under the control of a remote operator or authority. In addition, the memory 724 and/or data storage 728 of the RFPE 708 is used to store the preprocessed image data.

In processing actual or live image data, the process branches from step 816 to step 836, where the image data collected by the imaging system 108 is preprocessed and then processed using the OSVC model of the trained deep learning network 738. More particularly, the model can be used to return an output (step 840) in the form of a plurality of classified objects 120 corresponding to targets of interest to a user. The output results can thus include automated object classification, object identification to enable inferencing insights about target image objects 120 in a real image, and pose information to enable inferring further insights about target objects 120 in the real image. Therefore, operation of a deployed network 704 can include identifying objects 120 within an image, and then selectively propagating pose information for some identified objects 120, and not propagating pose information for other identified objects 120.

The operation of the deep learning network 738 can further include selecting a relevant set of images or areas within the full frame images that contain objects 120 of interest. Moreover, the imaging system 108 can operate to identify those objects 120 of interest based on vector information, such as the pose of elements of an object within the scene or the relative pose of objects 120 to one another. Other objects can be identified, but not associated with vector information that is propagated through the deep learning networks 738. For example, a lamp post may be identified by the deep learning network, but position and location information associated with the lamp post is not propagated through the deep learning network 738. In accordance with further embodiments of the present disclosure, the deep learning network 738 can select some or all images or sub-images containing objects of interest 120 for further analysis (i.e. potential autonomous action) or for delivery to a human analyst or to a system separate from the imaging system 108, for example via the communications interface 748 included as part of the host system 716. Therefore, embodiments of the present disclosure can improve runtime performance of the deep learning network 738 itself. Moreover, the runtime performance of autonomous applications that utilize image information selected by the deep learning network 738 of communications networks associated with a communication interface 748, and/or the workload of human analyst or other systems can be improved.

In accordance with still further embodiments of the present disclosure, the output results can be applied in an action taken autonomously by the platform 116. In particular, by providing real time or near real time identification of objects 120 within a scene 104 and information about such objects 120 from associated pose information, a deep learning network 738 running on an imaging system 108 in accordance with embodiments of the present disclosure can enable real time or near real-time action relative to such objects 120 to be taken autonomously. Examples of such action can include tracking an object 120 of interest, or directing a projectile towards the object 120. Alternatively or in addition, the output of the deep learning network 738, in the form of a subset of images collected by the imaging system 108, can be transmitted to a central command or authority, for example via the communication interface 748 of the host system 716.

In accordance with still further embodiments of the present disclosure, the deep learning network 738 can operate to isolate objects 120 of interest within a full frame image, and provide the area or areas of the full frame image to a downstream application or analyst for review and/or action.

In accordance with at least some embodiments of the present disclosure, the deployed network 738 incorporates a hybrid of a conventional neural network and an HCN. For example, a conventional neural network is used to identify objects within an image. Moreover, the conventional neural network can be used to identify objects within an image that are of particular interest. The objects identified as being of particular interest are then input to an HCN for further processing. Such processing can include the propagation of vector information related to the identified objects of particular interest through the HCN. Accordingly, some, but not all, of the identified objects are processed using the HCN. In accordance with still other embodiments of the present disclosure, the HCN can include a modified or optimized HCN, as discussed herein. More particularly, the modified HCN can implement pruning, such that vector information associated with some of the input objects is propagated through all or most of the layers of the HCN, while vector information associated with other of the input objects is pruned, either at the input or at a deeper layer of the HCN.

Still further embodiments of the present disclosure can operate to identify or localize objects or areas containing objects within an image (e.g., using bounding boxes or other methods to define one or more sub-frames) for processing using an HCN or a modified HCN. The identification or localization process can, for example, utilize a conventional neural network (e.g., with bounding boxes or other methods). In accordance with still other embodiments of the present disclosure, objects identified within an image can be classified and passed to an HCN for further processing. As a result of the classification process, different objects input to the HCN can be processed differently. For instance, a weighting or routing between capsules within a modified HCN of a first object can be different than that for a second object. As a particular example, a weight applied to the first object can be nonzero, while the weight applied to the second object can be zero. As another example, a first object capsule can be routed to an object capsule, while a second object capsule is not routed to that capsule.

Figure 9:
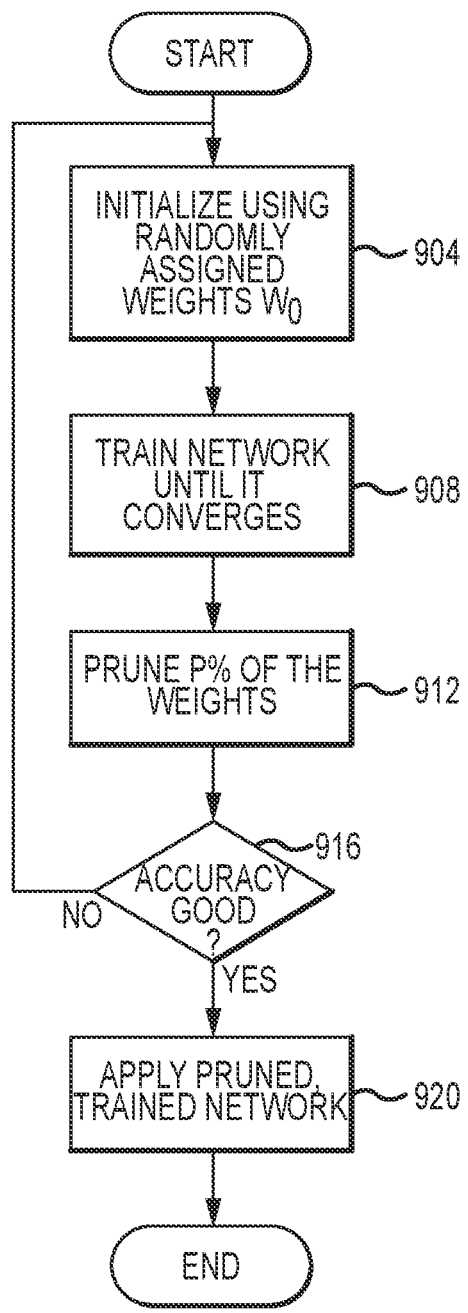
FIG. 9 depicts a pruning process in accordance with embodiments of the present disclosure.

FIG. 9 depicts an example a pruning process that can be applied in connection with executing a OSVC model in accordance with embodiments of the present disclosure. Initially, at step 904, the neural network is initialized using randomly assigned weights $W_0$. The network is then trained until it converges, arriving at weight parameters $W_j$ (step 908). Next, p % of the weights are pruned in the converged network by setting weights (e.g., the magnitude of the weights) smaller than some threshold value to zero (step 912). At step 916, a determination can be made as to whether the prediction accuracy of the present pruned network meet source close to the performance of the unpruned network. If the prediction accuracy does not approach the performance of the unpruned network, the process can return to step 904. If the prediction accuracy of the print network provides improved performance as compared to the unpruned network, the pruned, trained network can be used to predict outputs (step 920).

Figure 10:
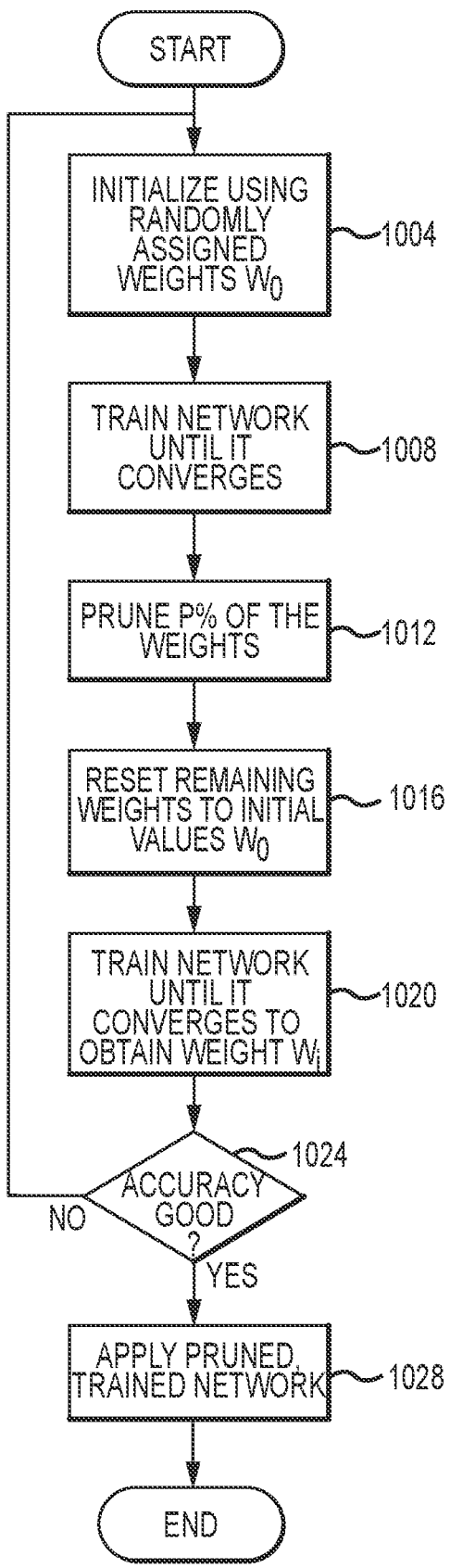
FIG. 10 depicts a pruning process in accordance with other embodiments of the present disclosure.

FIG. 10 depicts a pruning process in accordance with embodiments of the present disclosure that can be applied in connection with executing an OSVC model as disclosed herein. Initially, at step 1004, the neural network is initialized using randomly assigned weights $W_0$. The network is then trained until it converges, arriving at weight parameters $W_j$ (step 1008). Next, p % of the weights are pruned in the converged network by setting weights smaller than some threshold value to zero (step 1012). At step 1016, the remaining weights of the network are reset to their initial values $W_0$, with the weights that were set to zero frozen to create the winning lottery ticket network. Note that for very large networks, rather than resetting the remaining weights of the pruned network to their initial values $W_0$, improved network prediction accuracy can be obtained if those weights are set to the weights obtained after a small number of training steps $W_{0+}$. The pruned network is then trained until it converges, arriving at new weight parameters $W_j$ (step 1020). At step 1024, a determination is made as to whether the prediction accuracy of the pruned network is close to the performance of the unpruned network. If the prediction accuracy is not close to the performance of the unpruned network, the process can return to step 1004. If the prediction accuracy of the pruned, trained network is as good as or better than the unpruned network, the pruned, trained network is used to predict outputs (step 1028).

Figure 11:
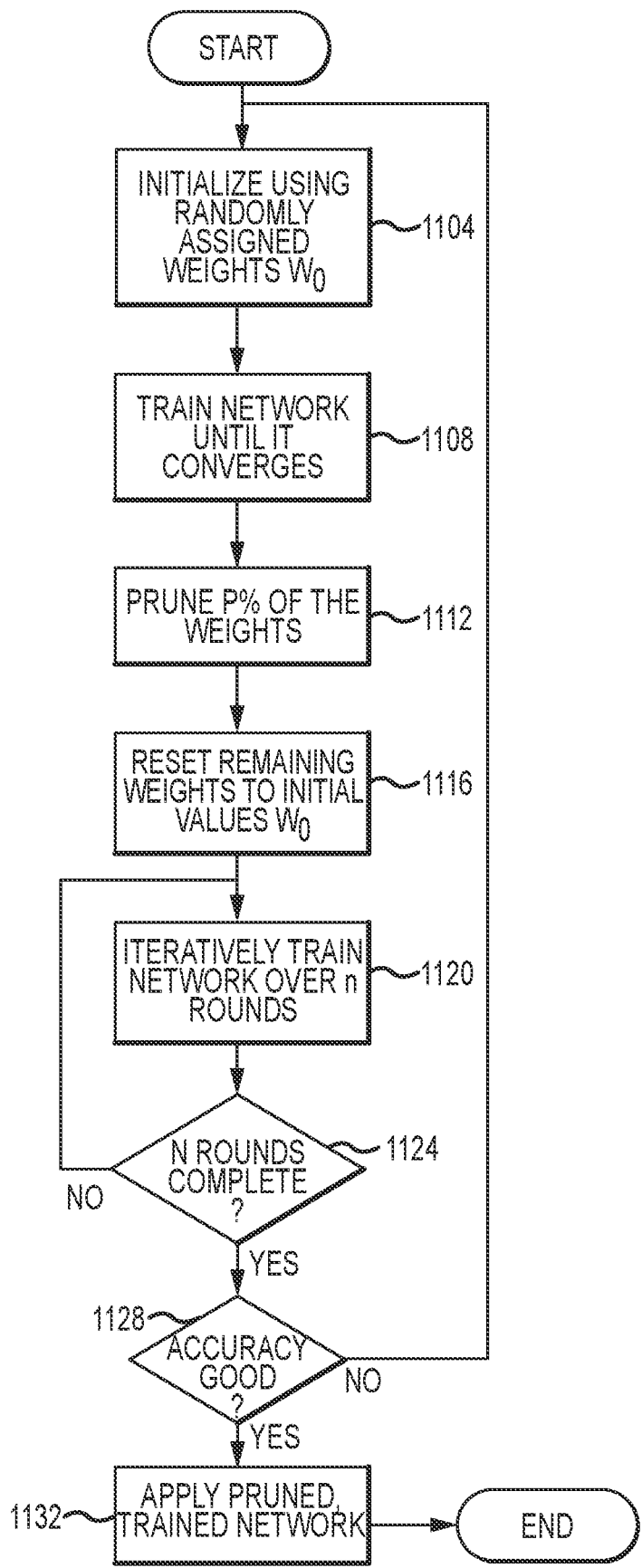
FIG. 11 depicts a pruning process in accordance with other embodiments of the present disclosure.

FIG. 11 depicts a pruning process in accordance with other embodiments of the present disclosure that can be applied in connection with executing an OSVC model as disclosed herein. The neural network is initialized using randomly assigned weights $W_0$ (step 1104). The network is then trained until it converges, arriving at weight parameters $W_j$ (step 1108). Next, p % of the weights are pruned in the converged network by setting weights smaller than some threshold value to zero (step 1112). At step 1116, the remaining weights of the print network are reset to their initial values $W_0$, with the weights that were set to zero frozen to create the winning lottery ticket network. Note that for very large networks, rather than resetting the remaining weights of the print network to their initial values $W_0$, improved network prediction accuracy can be obtained if those weights are set to the weights obtained after a small number of training steps $W_{0+}$. The network is then iteratively trained, pruned, and reset over n rounds, with each round pruning $p^{1/n}$% of the weights that survived the previous round (step 1120). This iterative pruning can be effective at finding winning tickets. At step 1124, a determination is made as to whether the n rounds of training have been completed. After the n rounds of training have been completed, a determination is made as to whether the prediction accuracy of the pruned network is close to the performance of the unpruned network (step 1128). If the prediction accuracy of the pruned network is not close to the performance of the unpruned network, the process can return to step 1104. Alternatively, if the prediction accuracy of the pruned network meets or is close to the performance of the unpruned network, the pruned, trained network is used to predict outputs (step 1132).

In accordance with other embodiments of the present disclosure, pruning is performed using weight similarity (e.g., cosine distance between weights) to remove redundant branches of the network.

In accordance with other embodiments of the present disclosure, the pruning methods described earlier may be combined with sparsity methods including but not limited to "dropouts" where values in the network are randomly set to 1 or zero at different stages of the training process.

Embodiments of the present disclosure include methods of providing high-accuracy, optimized runtime (e.g., real time or near real time) object classification and identification to help infer actionable-intelligence in a scene imaged by using a sensor connected to an RFPE 708 with advanced processing and storage capabilities including a Graphical Processing Unit (GPU) architecture in which model training, storing, and deploying OSVC processing takes place. Such methods can include:

a) Using a sensor with a focal plane array sensor to take multiple raw images of different scenes containing objects of interest and their vector information, b) Using the RFPE Digital Module to process the multiple raw images to remove the different noise and image defects. Each digital board can receive an aggregate of image data up to 50 Gbps. The extent of image processing conducted in the digital board vary for each application (e.g., algorithmic Non-Uniformity Correction (NUC) to remove Fix Pattern Noise). For reference, this embodiment of the invention uses the RFPE architecture with the addition of a Graphical Processing Unit (GPU) or other additional processing units such as a multicore processor. However, other embodiments could be implemented in non-RFPE based architectures.

c) Using the RFPE to output processed image data to a memory for storage for later OSVC processing, d) Transferring each cleaned-up image from memory to the specialized processor incorporating Graphical Processing Units (GPUs). This processor is designed to rapidly perform image and graphics processing using its highly parallel structure to manipulate large blocks of data and can employ developments such as Tensor Comprehensions (TC) that greatly simplifies DL, HCN, or other network framework implementations by providing a concise and powerful syntax which can be efficiently translated to high-performance computation kernels, automatically.

e) Using the GPU architecture in which HCN model training takes place, which propagates pose information.

f) Using the GPU architecture in which optimization by pruning takes place. In accordance with embodiments of the present disclosure, the HCN model is optimized by pruning to form the OSVC model. A plurality of "pruning" methods can be employed to simplify the HCN for optimized runtime performance. Pruning can include a plurality of individual or specific combined methods that: (a) use "weight similarity" to eliminate redundant neurons from the same network layer that have the same weights, (b) examine and eliminate the parts of the trained model that are not activated after it's trained, (c) examine and eliminate those parts that do not contribute to the specific vector outputs of interest selected by a user for a particular application, (d) optimizing the processing of the routing mechanisms between specific capsules in the HCN, (e) optimizing or reducing the number of the routings between specific capsules in the HCN, (f) use mechanisms such as a hybrid of a conventional DL and an HCN or an optimized HCN in which the conventional DL is used to quickly identify objects or object parts of interest in a larger scene or image using techniques such as localization (e.g., bounding boxes or other methods) and passing only the bounded objects or object parts to the HCN or optimized HCN for processing, and or (d) other methods. This OSVC model is stored in the GPU memory.

g) Deploying the OSVC model as part of to process to new data (e.g., putting the trained OSVC to work in real world situations by providing it with real satellite or UAV images in operation). The model automatically classifies and identifies the vector relationships of objects in the image which enables the inferencing of actionable intelligence.

h) Output automated object classification and identification to aid in inferring actionable insights about objects in a real image.

i) Additionally, in a particular example, real-time or near real-time target classification and identification is enabled by a number (e.g. 16) of parallel high-speed interconnect/interfaces (3.2 GBPS) between the RFPE 708 and the FPA 704, low level processing in a micro-sequencer facility of the RFPE, data compression, and an existing pruned baseline deep learning model which provides image classification and identification by running on a fast GPU.

Embodiments of the present disclosure can further include methods of providing high-accuracy, optimized runtime (e.g., real-time or near real time) object classification and identification to enable actionable-intelligence inference in a scene imaged by using a sensor, such as but not limited to a focal plane array 704, or connected to an RFPE 708 with advanced processing and storage capabilities including a plurality of multiple Graphical Processing Unit (GPU) arranged in parallel for training, storing, and deploying OSVC processing for different missions.

Still further embodiments of the present disclosure can include methods of providing high-accuracy, optimized runtime (e.g., real-time or near real time) object classification and identification to enable actionable-intelligence inference in a scene imaged by using a sensor connected to a non-RFPE system with advanced processing and storage capabilities including a plurality of multiple Graphical Processing Unit (GPU) arranged in parallel for training, storing, and deploying OSVC processing for different missions.

Accordingly, one of skill in the art can appreciate that conventional DLNs are not designed to keep track of vector-based relationships. These networks utilize early neurons in the deep network to classify things like edges and gradients, building up to higher level features, and then make generic representations about an image. As such, deep learning networks require 100,000's of images for training and do not capture the vector-based information needed to make robust inferences. Hinton's Capsule Networks, while powerful because they do retain vector-based information, need to be optimized to increase runtime performance.

Embodiments of the present disclosure overcome various disadvantages of conventional DLN implementations, and can incorporate:

(1) HCN training in which pose information is propagated;

(2) Pruning of the HCN to simplify the number of operation for optimized runtime performance;

(3) The model automatically classifies and identifies the vector relationships of objects in the image which enables the inferencing of actionable intelligence;

(4) Reconfigurable Focal Plane Electronics (RFPE). The digital module within the RFPE uses a reprogrammable FPGA micro sequencer generator that can store dozens of complex image data collection scenarios (user-input). Furthermore, the re-programmability of the FPGA allows for modification and addition even on orbit. Some of the functionality provided by the micro-sequencer useful for this invention include lossy and lossless image compression, pixel level gain and offset (a.k.a. NUC) correction, frame co-adding, decoding/encoding of cyclical redundancy check sensor data, and bad pixel correction in real-time. The digital module implements all control, processing, and formatting functions in firmware.

(5) Utilizes a Graphical Processing Unit (GPU)-enabled specialized processor. This processor is designed to rapidly perform image and graphics processing by exploiting the GPU's highly parallel structure to manipulate large blocks of data.

Embodiments of the present disclosure provide high accuracy, optimized runtime (e.g., real-time or near real time) target vector-enhanced classification and identification by leveraging advanced RFPE capabilities and artificial intelligence-based OSVC processing.

Embodiments of the present disclosure provide a method of using advanced image processing and graphics processing techniques plus artificial intelligence-based processing to provide high-accuracy, optimized runtime (e.g., real-time or near real time) object classification and identification to help in the inference of actionable-intelligence. This is enabled by particular technologies: Reconfigurable focal plane electronics (RFPE), Graphical Processing Units (GPUs) and an optimized HCN model referred to herein as an Optimized Selected Vector Concatenation model (OSVC). An OSVC model is developed and applied in the following steps:

1. HCN training, which propagates pose information.

2. Optimization by pruning. Embodiments of the present disclosure can include "pruning" to simplify the HCN for optimized runtime performance. Pruning can include a plurality of individual or specific combined methods that: (a) use "weight similarity" to eliminate redundant neurons from the same network layer that have the same weights, (b) examine and eliminate the parts of the trained model that are not activated after it's trained, (c) examine and eliminate those parts that do not contribute to the specific vector outputs of interest selected by a user for a particular application, (d) optimizing the processing of the routing mechanism between specific capsules in the HCN, (e) optimizing or reducing the number of the routings between specific capsules in the HCN, (f) use mechanisms such as a hybrid of a conventional DL and an HCN or an optimized HCN in which the conventional DL is used to quickly identify objects or object parts of interest in a larger scene or image using techniques such as localization (e.g., using bounding boxes or other methods) and passing only the bounded objects or object parts to the HCN or optimized HCN for processing, and/or (d) other methods.

3. The OSVC model is deployed to process new data (e.g., putting the trained OSVC to work in real world situations by providing it with real satellite or UAV images in operation). The model automatically classifies and identifies the vector relationships of objects in the image which enables the inferencing of actionable intelligence.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An image processing method, comprising:
   obtaining an image of a scene;
   identifying each of a plurality of objects within the scene;
   processing information associated with the identified objects, wherein for a first set of the identified objects the processed information includes identity information and vector information, and wherein for a second set of the identified objects the processed information includes identity information and does not include vector information;
   determining that at least a first one of the objects in the identified plurality of objects is an object of interest;
   determining that at least a second one of the objects in the identified plurality of objects is not an object of interest;
   propagating pose information for the first one of the objects in the identified plurality of objects through a deep learning network, wherein the pose information includes a position and an orientation of the first one of the objects; and
   not propagating pose information for the second one of the objects in the identified plurality of objects through the deep learning network.

2. The method of claim 1, wherein no member of the first set of identified objects is a member of the second set of identified objects.

3. The method of claim 2, wherein the pose information includes position information and orientation information of an element of the first one of the objects.

4. The method of claim 3, further comprising:
   applying the position information and the orientation information of a plurality of objects within the first set of the identified objects to infer a characteristic of the imaged scene.

5. The method of claim 2, wherein the pose information includes information regarding position and orientation information of the first one of the objects relative to a second one of the objects.

6. The method of claim 5, further comprising:
   applying orientation information of a single object within the first set of identified objects to infer a characteristic of the imaged scene.

7. The method of claim 6, wherein the first set of identified objects contains only the single object.

8. The method of claim 1, further comprising:
   obtaining a plurality of images of the scene; and
   identifying a first set of the plurality of images, wherein each image in the first set of the plurality of images includes at least one object in the first set of identified objects.

9. The method of claim 8, wherein the method is performed on a platform carrying an imaging system that obtained the plurality of images of the scene.

10. The method of claim 9, further comprising:
    transmitting the first set of the plurality of images to another system.

11. The method of claim 9, further comprising:
    taking action relative to one of the identified objects.

12. A method, comprising:
    collecting a first plurality of images;
    training a network to recognize objects within the plurality of images using position and orientation information of the objects, wherein at east some of the objects in the recognized objects are determined to be objects of interest, wherein at least some others of the objects in the recognized objects are determined to not be of interest, wherein pose information for the objects determined to be objects of interest is propagated through a deep learning network, wherein pose information for the objects determined to not be of interest is not propagated through the deep learning network, wherein scalar and vector information regarding at least some of the recognized objects is propagated through the network, and wherein only scalar information regarding at least some other of the recognized objects is propagated through the network;
    deploying the trained network on a platform;
    obtaining a second plurality of images using an imaging system carried by the deployed platform;

analyzing the second plurality of images using the trained network, wherein the trained network is implemented by a processor on the platform; and providing an output that includes information regarding an object identified within an image included in the second plurality of images.

13. The method of claim 12, further comprising:

pointing the imaging system to track one of the objects identified within an image included in the second plurality of images.

14. The method of claim 12, wherein the object identified within an image is one of a plurality of objects, and wherein the plurality of objects have an identified relationship between one another.

15. The method of claim 12, wherein the output is a portion of a full-frame image that includes the identified object.

16. An imaging system, comprising:

a host system;

reconfigurable focal plane electronics, including:
 memory;
 application programming stored in the memory and implementing a deep learning network; and
 a processor; and a focal plane array, wherein the application programming identifies objects within at least some images collected by the focal plane array using position and orientation information of the objects, wherein at least a first one of the objects in the identified objects is determined to be an object of interest, wherein at least a second one of the objects in the identified objects is determined to not be of interest, wherein pose information for the first one of the objects is propagated through a deep learning network wherein pose information for second one of the other objects is not propagated through the deep learning network, and wherein the imaging system one of transmits image data including at least one identified object of interest or takes action relative to the at least one identified object of interest.

17. The imaging system of claim 16, wherein the host system includes a communication interface, and wherein the imaging system transmits image data including at least one identified object using the communication interface.

18. The imaging system of claim 16, wherein the processor includes a plurality of graphical processing units.

19. The imaging system of claim 18, wherein each of the graphical processing units is associated with a memory.

20. The imaging system of claim 16, wherein the imaging system is carried by a remote platform.

\* \* \* \* \*